Feb. 12, 1952     C. ANDERMATT     2,584,973
COOLING AND SEALING MEANS FOR DISK ATOMIZER SHAFTS
Filed July 29, 1947
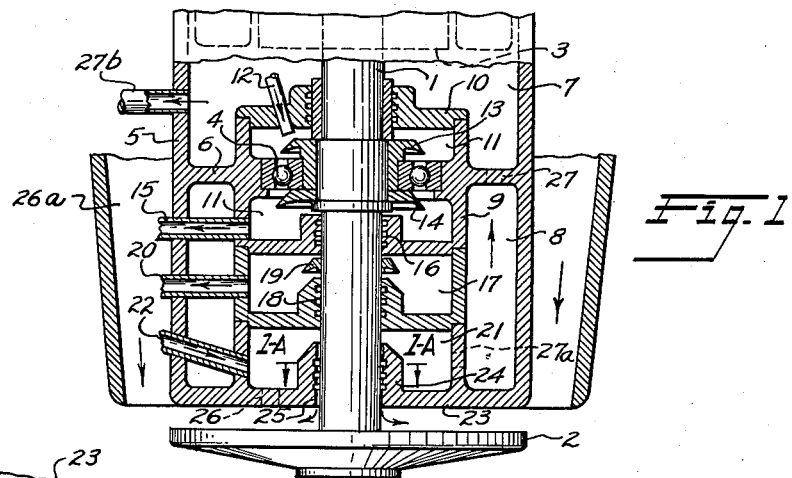
Fig. 1
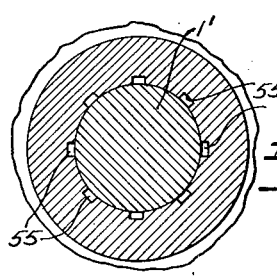
Fig. 1-A
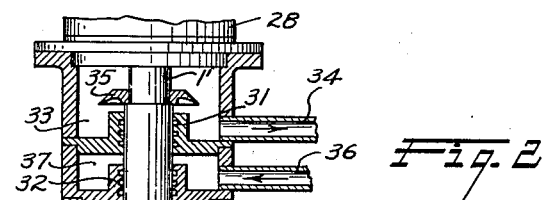
Fig. 2
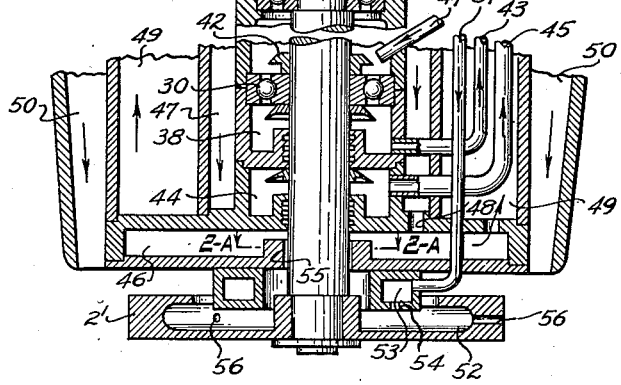
Fig. 2-A
INVENTOR
CARL ANDERMATT
BY Strauch, Nolan & Diggins
ATTORNEYS Patented Feb. 12, 1952

2,584,973

UNITED STATES PATENT OFFICE 2,584,973

COOLING AND SEALING MEANS FOR DISK ATOMIZER SHAFTS

Carl Andermatt, Zurich, Switzerland, assignor to Luwa, S. A., Zurich, Switzerland, a corporation of Switzerland Application July 29, 1947, Serial No. 764,797
In Switzerland April 10, 1947

5 Claims. (Cl. 159—4)

1

The atomizing devices which at the present time are coming more and more into use in which a liquid medium is centrifugally projected by a rapidly rotating atomizing disc against a current of hot air, the liquid dried in this manner emerging from the process in the form of a powder, impose very heavy demands on the bearings of the atomizer disc-shaft. In the first place, an obvious pre-requisite is that the bearings as such should be perfect, and in addition to this, in view of the high speed of rotation of the shaft, the bearing must be kept free of all contamination. Furthermore, in view of the circumstance that in the great majority of cases the materials to be atomized are substances serving for human nourishment, or substances sensitive to oil, the most painstaking care must be taken to ensure that no lubricant enters the atomizing or pulverizing chambers, since it is obvious that even extremely small quantities of impurities would render unusable the powder produced.

Finally the fact must also be borne in mind that the currents of air whose task it is to dry the atomized liquid medium must of necessity be at a high temperature, and this can easily lead to the burning of the medium being dried, and to deposits being formed on the bearings.

These brief remarks are intended to show the enormous difficulties which arise in connection with the provision of the atomizer shaft with bearings.

It is true that, for the most varied purposes, the use of seals on rotating shafts is known, such seals being used for instance to prevent the pressures existing in turbines from being dissipated to the exterior, or for sealing off, each from the other, chambers containing liquids under pressure. However, none of the purposes hitherto known for the use of such washers or seals presents such an extensive range of requirements which the bearings must meet as does the disposition of atomizer disc shafts in pulverization dehydrating plants.

The object of the present invention is a device on or about the bearings of high-speed atomizer shafts which device meets, as practical tests have shown, all the requirements mentioned in the preamble hereto, which are imposed on the bearings of high-speed atomizer shafts.

The device in accordance with the present invention is characterized by the fact that the shaft is carried on at least one ball-bearing assembly and that in the direction towards the atomizing or pulverizing chamber at least two chambers succeed the bearing chamber, said two chambers

2 being sealed off against the shafts and closed each against the other, the bearing chamber being connected to oil supply and discharge pipes or tubes, the following chamber being connected to a tension relieving pipe and the next chamber being connected to a gas supply tube, the last mentioned chamber contacting the shaft by means of a wall possessing openings permitting the passage of the gas, so that the gas supplied accumulates in this chamber and serves to cool in particular that section of wall which is directed towards the pulverizer disc and serves further as a seal both against the passage of oil vapour from the tension relieving chamber and against the ingress of dust from the atomizing or pulverizing chamber.

In the enclosed drawing Figures 1 and 2 represent two typical embodiments of the invention, in which drawing:

Fig. 1 is a section through the bearing of the pulverizer disc in a first embodiment;

Figure 1A is a transverse sectional view taken along the line 1A—1A of Figure 1;

Fig. 2 is a section through the bearing of the pulverizer disc in an alternative embodiment; and Figure 2A is a transverse sectional view taken along the line 2A—2A of Figure 2.

To shaft 1 is secured the atomizer disc 2. Shaft 1 is driven by any selected source of power, for instance an electric motor 3. The shaft 1 is journalled in the housing 5 by means of the ball-bearing assembly 4. The housing 5 is inserted into the container, not shown, which forms the atomizing chamber, the wall 6 providing the means of separation between the chamber 7, which may for instance be open to the ambient air, and the chamber 8, which communicates with the pulverizing or atomizing chamber. On the dividing wall 6 or a cylindrical tube 9 contiguous thereto, is fitted an ordinary sealing collar 10. The sealing collar 10 forms the upper limit of the chamber 11, in which is located the ball-bearing assembly 4. Through the pipe 12 the oil is fed into the chamber 11 and atomized by a centrifugal baffle ring 13 to form an oil vapour which lubricates the ball-bearing assembly 4. Immediately below the ball-bearing assembly 4, and likewise projecting into the chamber 11, a further centrifugal baffle ring 14 is provided which projects the oil vapour entering via the ball-bearing assembly 4 towards the oil discharge pipe 15, which likewise opens into the chamber 11. The chamber 11 is closed against the shaft 1 by means of a seal, for example a labyrinth seal 16, this largely preventing the passage of oil into the immediately succeeding pressure chamber 17. The succeeding chamber 17 similarly rests on the shaft by means of a labyrinth seal 18 and is provided, immediately below the labyrinth seal 16 of the chamber 11, with a centrifugal baffle ring 19. This baffle ring serves the purpose of projecting towards the pressure relieving tube 20 any oil vapour which may nevertheless succeed in passing through the labyrinth seal 16. In the pressure relieving pipe 20 is maintained a pressure which in any event is less than that obtaining in chamber 11 and also than that obtaining in the cooling chamber 21 which succeeds chamber 17. A gas supply duct or pipe 22 opens into the chamber 21. Through this pipe 22 a gas, such for instance as air, is supplied, preferably under pressure, the temperature of said gas being in any case lower than that of the gas used for drying or dehydrating purposes. This gas accumulates in the chamber 21 and will first cool the wall 23 which is adjacent the pulverizing disc 2. The gas so supplied will, however, also pass via the labyrinth seal into the chamber 17, in which the pressure is lower than in chamber 21 and is led off through the pipe 20 together with any oil vapour which may have passed through the labyrinth seal 16. The result of this is to create a lock or seal which inevitably prevents the incursion of oil vapour into the chamber 21. The wall 24 by means of which the chamber 21 rests against the shaft 1 possesses small openings, as for example slots 25, which allow the passage of the gas supplied through the pipe 22. The gas is evacuated in the direction indicated by the arrows. This provides a seal against the ingress of dust from the pulverizing chamber and at the same time cools the pulverizing or atomizing disc. In the wall 23 borings 26 can, for example, be provided, through which borings the gas supplied through the pipe 22 can pass to cool the pulverizer disc directly. In this embodiment considerable quantities of gas must be supplied through the pipe 22, in order to ensure the maintenance of the current of sealing gas through the slots 25. Annular chamber 8 is contiguous to the annular chamber 26a, which latter serves for the supply of the hot air used for drying or dehydrating purposes.

The gas in the chamber 21 and serving for cooling and sealing purposes can, however, also be completely or partially used for the cooling of the motor 3 and of the outer bearing walls of the bearing chamber 11. For that purpose a passage 27 in the wall 6, an opening 27a from chamber 8 to chamber 21, and an outlet 27b for chamber 7 must be provided. The liquid is brought to the disc 2 by any suitable means not shown in the drawings, for example, through a passage formed in the shaft 1.

In the embodiment shown in Figure 2 a hydraulic engine 28, for instance, is used instead of the electric motor for the drive of the shaft 1'. A hydraulic engine has the advantage of regulability of the speed of revolution within wide limits. In the embodiment shown in Figure 2 two ball-bearing assemblies 29 and 30 are provided for the bearing of shaft 1'. In the upper part of the bearing labyrinth seals 31 and 32 are again provided. A pipe 34, leading into the open or into an oil container, opens into chamber 33. Through this pipe 34 any seepage fluid which may come from the driving unit 28 and be projected from the shaft 1' by the centrifugal baffle ring 35, will be led away. At the same time a sealing gas fed into chamber 37 by pipe 36 and entering chamber 33 from chamber 37 through the labyrinth seal 31 is evacuated through pipe 34. Portions of the sealing gas supplied will pass through the labyrinth seal 32 into the bearing chamber 38 and there serve to cool the ball-bearing assembly 29.

Via the pipe 39 is fed the oil for lubricating the ball-bearing assembly 29, and the centrifugal baffle ring 40 forms of it an oil vapour which penetrates into the bearing 29. Chamber 38 also contains the second bearing 30, it being possible to provide, immediately above the bearing 30, a second oil supply pipe 41 and a centrifugal baffle ring 42. The shaft is shown fractured in Fig. 2 so as to abbreviate the representation of the bearing arrangement. The bottom of the bearing chamber 38 is connected to an oil discharge pipe 43 similarly to the embodiment in accordance with Fig. 1. The pressure chamber 44 which succeeds chamber 38 lies again on a tension relieving pipe 45, and the next cooling chamber, 46, is again fed with gas. The functions of these chambers are the same as in the embodiment in accordance with Fig. 1. However, in the embodiment in accordance with Fig. 2 the supply of the sealing gas is effected through the duct formed by annular chamber 47 and borings 48 to the chamber 46. In a second annular chamber 49 portions of the gas fed in are discharged. Whilst the annular chamber 47 is directly contiguous to the walls of the bearings, so that the gas fed through this annular chamber cools the bearing, annular chamber 49 is contiguous to the annular chamber 50, which serves for the supply of the hot air used for drying or dehydrating purposes. This arrangement prevents an excessive transfer of heat from annular chamber 50 to the bearing chamber. The pipe 51 serves to feed in the liquid medium requiring to be atomized or pulverized.

The atomizer or pulverizer disc 2' is provided in the embodiment in accordance with Figure 2 with a cavity 52 into which the liquid medium is fed via the liquid feed distributor chamber 53 and the outflow openings 54 disposed therein. Through the slots 55 provided in that wall of chamber 46 which is contiguous to the shaft 1' a portion of the gas supplied is, in a similar manner to that obtaining in the case of the embodiment in accordance with Figure 1, also fed to the cavity 52 in the pulverizer disc 2, which latter it cools. The liquid supplied then emerges through the openings 56 in the pulverizer disc 2', is atomized and comes within range of the hot air supplied through the annular chamber 50 and serving for drying or dehydrating purposes.

The two embodiments illustrated should prove conclusively that the device in accordance with the invention ensures on the one hand complete sealing off of the bearing both in respect of the passage of lubricant into the pulverizing chamber from the bearing chamber: and that on the other hand as a result of the suitable guidance of the current of sealing and cooling air those parts in regard to which there exists the danger of the burning-on and firm deposition of the material being pulverized are adequately cooled.

I claim:

1. A cooling and sealing device for a disc atomizer shaft carrying a disc enclosed in an atomizing chamber; said device comprising a ball-bearing assembly carrying said shaft; means constituting casing walls forming a bearing chamber enclosing said ball-bearing assembly, a pressure chamber adjacent to said bearing chamber and a cooling chamber adjacent to said atomizing chamber, some of the walls of said chambers enclosing said shaft; an oil supply pipe opening into said bearing chamber; an oil discharge pipe communicating with said bearing chamber; a pressure-relieving pipe communicating with said pressure chamber; and a gas supply duct opening into said cooling chamber; said cooling chamber having a wall located adjacent to said disc and having openings formed therein, whereby gas supplied to said cooling chamber through said gas supply duct cools the last-mentioned wall and provides a seal against the passage of oil vapor from said pressure chamber and against the passage of the dust from said atomizing chamber.

2. A device in accordance with claim 1, wherein said openings of the cooling chamber communicate with the atomizing chamber.

3. A device in accordance with claim 1, having means forming a liquid feed distributor chamber located between said disc and said cooling chamber and adjacent to the openings of said cooling chamber, whereby gas emerging from said openings cools the walls of said liquid feed distributing chamber.

4. A device in accordance with claim 1, wherein said means include an annular chamber communicating with said cooling chamber to receive at least some of the gas supplied to said cooling chamber; and another annular chamber contiguous to the first-mentioned annular chamber and transmitting hot air toward the disc.

5. A device in accordance with claim 1, having a motor driving said shaft and wherein said means include means communicating with said gas supply duct for cooling a wall of said bearing chamber and said motor by a portion of the gas flowing from said gas supply duct.

CARL ANDERMATT.

REFERENCES CITED

The following references are of record in the file of this patent:

UNITED STATES PATENTS

| Number | Name | Date |
|---|---|---|
| 1,677,119 | Kinyon | July 10, 1928 |
| 2,125,446 | Hurtt | Aug. 2, 1938 |
| 2,188,506 | Hall | Jan. 30, 1940 |
| 2,253,350 | Ross et al. | Aug. 19, 1941 |
| 2,287,795 | Hall | June 30, 1942 |
| 2,299,119 | Yeomans | Oct. 20, 1942 |
| 2,439,127 | Dailey, Jr. et al. | Apr. 6, 1948 |